United States Patent
Tachibana et al.

(10) Patent No.: US 7,241,519 B2
(45) Date of Patent: Jul. 10, 2007

(54) MAGNETIC RECORDING MEDIUM WITH COLUMAR MAGNETIC LAYER

(75) Inventors: Junichi Tachibana, Miyagi (JP); Yuichi Arisaka, Miyagi (JP); Hiroshi Mizuno, Miyagi (JP); Takuya Ito, Miyagi (JP)

(73) Assignee: Sony Corporation, Tokyo (JP)

( * ) Notice: Subject to any disclaimer, the term of this patent is extended or adjusted under 35 U.S.C. 154(b) by 358 days.

(21) Appl. No.: 10/885,185

(22) Filed: Jul. 6, 2004

(65) Prior Publication Data

US 2005/0008899 A1 Jan. 13, 2005

(30) Foreign Application Priority Data

Jul. 7, 2003 (JP) ............... P2003-271388
Sep. 12, 2003 (JP) ............... P2003-322085

(51) Int. Cl.
*G11B 5/65* (2006.01)
*G11B 5/68* (2006.01)
*G11B 5/714* (2006.01)

(52) U.S. Cl. ............... 428/836.2; 428/836.3; 428/842.4

(58) Field of Classification Search ............... None
See application file for complete search history.

(56) References Cited

U.S. PATENT DOCUMENTS 5,908,711 A * 6/1999 Tachibana ............... 428/836.1
6,174,597 B1 * 1/2001 Yusu et al. ............... 428/332
6,773,745 B2 * 8/2004 Arisaka et al. ............... 427/130

FOREIGN PATENT DOCUMENTS

| JP | 60-154323 | | 8/1985 |
| JP | 08-083418 | | 3/1996 |
| JP | 09-305951 | | 11/1997 |
| JP | 11-154320 | | 8/1999 |
| JP | 11-306535 | | 11/1999 |
| JP | 2000-030235 | | 1/2000 |
| JP | 2002-358615 | | 12/2002 |
| JP | 2003-006831 | | 1/2003 |
| JP | 2003-006831 A | * | 1/2003 |
| JP | 2003-059040 | | 2/2003 |

OTHER PUBLICATIONS

Derwent Abstract Translation of JP 2003-059040 A (Derwent Acc-No.: 2003-521845).*
Derwent Abstract Translation of JP 2003-006831 A (Derwent Acc-No.: 2003-271588).*
Machine Translation of JP 2003-006831 A.*
Japanese Office Action 2003-271388 dated Sep. 26, 2006.
Japanese Office Action 2003-322085 dated Oct. 16, 2006.

* cited by examiner

*Primary Examiner*—Kevin M. Bernatz
(74) *Attorney, Agent, or Firm*—Sonnenschein Nath & Rosenthal LLP

(57) ABSTRACT

Provided is a magnetic recording medium capable of achieving higher density recording. The magnetic recording medium comprises a magnetic layer formed on a non-magnetic base through vacuum oblique evaporation. The magnetic layer includes a plurality of columns in which 3 to 7 ferromagnetic particles with an average diameter of 5 to 10 nm are arranged in a line, and non-magnetic particles are disposed between columns so as to separate the columns from one another. A value Y/X defined as a ratio of an average value Y of a distance between the centers of adjacent columns in a film in-plane direction to an average value X of a distance between the centers of adjacent columns in a film thickness direction is preferably 0.5 or more.

4 Claims, 4 Drawing Sheets

MAGNETIC RECORDING MEDIUM WITH COLUMAR MAGNETIC LAYER

BACKGROUND OF THE INVENTION

1. Field of the Invention

The present invention relates to a magnetic recording medium, and more specifically an evaporation type magnetic recording medium with a columnar structure having ferromagnetic particles and non-magnetic particles.

2. Description of the Related Art

For example, in the field of video tape recorders (VTRs), in order to achieve higher image quality, there is a stronger demand for higher density recording. As a magnetic recording medium satisfying the demand, a so-called magnetic metal thin film type magnetic recording medium, in which a ferromagnetic material is deposited directly on a non-magnetic base by a plating technique or a vacuum thin film forming technique to form a magnetic layer, has been proposed.

Compared to a coating type magnetic recording medium, the magnetic metal thin film type magnetic recording medium is superior in coercive force, residual magnetization, squareness ratio and the like, and also in read/write characteristics at a short wavelength. Moreover, since the ferromagnetic material is directly deposited, the thickness of the magnetic layer can be extremely thin. Therefore, recording demagnetization and thickness loss during reproduction can be significantly reduced so that good read/write characteristics can be obtained. Further, there is no need to mix a non-magnetic binder or an additive in the magnetic layer, so the filling density of the magnetic material is increased, thereby the magnetic flux density can be increased.

In particular, as a magnetic tape (evaporated tape) including a magnetic layer formed by vacuum evaporation has stable characteristics and high production efficiency, the magnetic tape has already been put into practical use as high-band 8 mm tape, consumer digital video tape, and computer data recording tape such as AIT (Advanced Intelligent Tape) and Mammoth. In order to further improve the read/write characteristics of the magnetic tape and obtain a larger reproduction output, vacuum oblique evaporation in which a ferromagnetic material is deposited through injecting the ferromagnetic material obliquely with respect to a non-magnetic base has been proposed. In the case where the vacuum oblique evaporation is used, it is known that ferromagnetic particles form a plurality of columnar clusters (columns), so the magnetic layer has a structure in which the columns are arranged on the non-magnetic base.

In general, such a structure of the magnetic layer is called a "columnar structure". A conventional columnar structure in which ferromagnetic particles and non-magnetic particles are randomly gathered to form a column has been known. In the column in which the ferromagnetic particles and the non-magnetic particles are randomly gathered, the diameter of the ferromagnetic particles is approximately 10 nm in general.

However, in order to respond to a recent demand for a higher recording density, a further improvement in the reproduction output and a reduction in noise are required. Therefore, it has been considered that the columnar structure is specified or a manufacturing method is improved so as to improve the characteristics.

For example, in Japanese Unexamined Patent Application Publication No. 2003-6831, a magnetic layer including columns of ferromagnetic particles, and non-magnetic particles which are disposed so as to separate the columns from one another is described. The columns each has a structure in which three or more ferromagnetic particles are arranged in a line, and the diameter of each column is approximately 15 nm or less. The crystals of the ferromagnetic particles are oriented in the longitudinal direction of the column, and the diameter of the ferromagnetic particles is approximately 10 nm or less.

Moreover, it is described in Japanese Unexamined Patent Application Publication No. 2003-59040 that when the film forming rate of a magnetic layer is 0.5 µm/s or more, and preferably 1.0 µm or more, the diameter of ferromagnetic particles and variations thereof can be reduced, and the a reproduction output and a carrier-to-noise ratio (CNR) can be improved. In Japanese Unexamined Patent Application Publication Nos. 2003-6831 and 2003-59040, as the magnetic layer, for example, a Co—O thin film is formed.

Thus, for the purpose of improving the recording density of the magnetic recording medium, the columnar structure has been studied; however, no magnetic recording medium in which a space between columns in the film thickness direction and t he film in-plane direction of the magnetic layer is specified has been disclosed. The read/write characteristics of the magnetic tape changes by such a space between the columns. Therefore, it is required to consider and suitably control not only the diameter of magnetic particles and the number of magnetic particles forming a column but also a positional relationship between columns.

Moreover, in order to obtain a sufficient CNR in a high recording density region, a medium design technique to reduce medium noise while securing an optimum reproduction output for a recording/reproduction system is important. As the reproduction output is heavily dependent to the sensitivity of a reproducing head, specifically a medium with lower medium noise is important.

The medium noise is caused by the internal microstructure of a magnetic thin film. For example, in the consumer digital video tape and the like, residual magnetization Mr, coercive force Hc, the thickness t of a magnetic layer, and the product MrHct thereof are optimized so as to achieve a higher CNR (for example, refer to Japanese Unexamined Patent Application Publication No. Hei 6-4851 and Japanese Patent No. 3104364).

However, while the thickness of the magnetic layer in the consumer digital video tape is approximately 200 nm, there is a tendency to reduce the thickness of a magnetic layer in a magnetic recording medium used for an AMR head using an anisotropic magnetoresistive (AMR) effect or a GMR head using a giant magnetoresistive (GMR) effect, so a magnetic layer with a thickness of 20 nm to 40 nm is mainly used at present. Thus, in a medium in which the thickness of the magnetic layer required for high density is 100 nm or less, the size and the acicular ratio of magnetic particles in the magnetic layer have a large influence on a medium noise level. Therefore, the optimization of the above-described parameters is not sufficient, and it is important to optimize another magnetic parameter for reflecting the size and the acicular ratio of the magnetic particles. A magnetic parameter showing the size of the magnetic particles and noise characteristics are reported by Takayama et al. (refer to Technical Report of IEICE, Takayama et al., MR96-23, September 1996, pp. 23-28).

SUMMARY OF THE INVENTION

In view of the foregoing, it is an object of the invention to provide a magnetic recording medium capable of achieving higher density recording.

A magnetic recording medium according to the invention comprises: a magnetic layer with a columnar structure on a non-magnetic base, wherein the columnar structure includes: a plurality of columns which are clusters of ferromagnetic particles; and non-magnetic particles disposed around the columns so as to separate the columns from one another, and a value Y/X defined as a ratio of an average value Y of a distance between the centers of the columns adjacent to each other in a film in-plane direction to an average value X of a distance between the centers of the columns adjacent to each other in a film thickness direction is 0.5 or more.

Moreover, it is preferable that the columns each have a structure in which three to seven of the ferromagnetic particles are arranged in a line. The average diameter of the ferromagnetic particles is preferably within a range of 5 nm to 10 nm inclusive. Further, the thickness of the magnetic layer is preferably 100 nm or less.

Moreover, it is preferable that in the magnetic layer, the product VacMst of a magnetization reversal volume Vac, saturation magnetization Ms and a thickness t is $1.3 \times 10^{-23}$ $Am^3$ or less, and an anisotropic magnetic field $Hk^{grain}$ in a crystal grain is 1100 kA/m or more, and the product MsHc of saturation magnetization Ms and coercive force Hc is 40000 $MA^2/m^2$ or more.

In the magnetic recording medium according to the invention, the above ratio Y/X is 0.5 or more, so read/write characteristics can be improved, and a higher recording density can be achieved. Moreover, when the thickness of the magnetic layer is 100 nm or less, the magnetic recording medium according to the invention meets the signal detection sensitivity of an AMR head or a GMR head, and these high-sensitive heads can be used for reproduction of recording signals. Therefore, the recording density can be improved.

Further, when the product VacMst of the magnetization reversal volume Vac, the saturation magnetization Ms and the thickness t in the magnetic layer is $1.3 \times 10^{-23}$ $Am^3$ or less, and the anisotropic magnetic field $Hk^{grain}$ in a crystal grain is 1100 kA/m or more, the size and the acicular ratio of magnetic particles can be appropriately controlled. The size and the acicular ratio of the magnetic particles are factors which have an influence specifically on noise characteristics in the case where the thickness of the magnetic layer is thin, so even if the thickness of the magnetic layer is thin, superior magnetic conversion characteristics can be obtained by controlling them. Therefore, superior output characteristics can be obtained even in the case where the magnetic recording medium according to the invention is used for the AMR head or the GMR head.

In addition, when the product MsHc of the saturation magnetization Ms and the coercive force Hc in the magnetic layer is 40000 $MA^2/m^2$ or more, a superior reproduction output can be obtained.

Other and further objects, features and advantages of the invention will appear more fully from the following description.

DETAILED DESCRIPTION OF THE PREFERRED EMBODIMENTS

Preferred embodiments of the present invention will be described in more detail below referring to the accompanying drawings.

Figure 1:
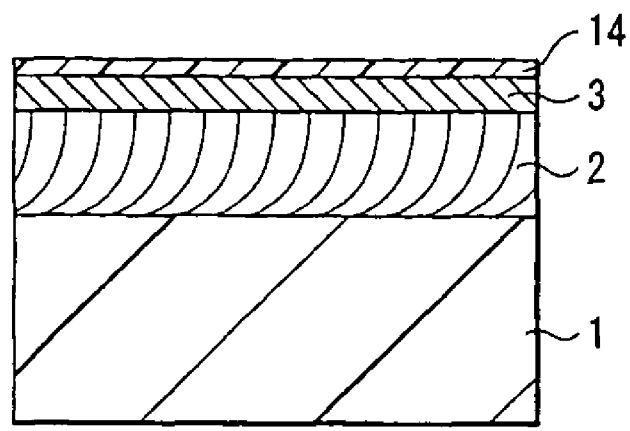
FIG. 1 is a sectional view of a magnetic recording medium according to an embodiment of the invention.

FIG. 1 shows a sectional view of a magnetic tape which is a magnetic recording medium according to an embodiment of the invention. The magnetic tape comprises, for example, a magnetic layer 2, a protective layer 3 and a topcoat layer 4 which are laminated in this order on a non-magnetic base 1.

The non-magnetic base 1 is made of, for example, a high molecular weight material typified by polyesters, polyolefins, a cellulose derivative, a vinyl resin, polyimides, polyamides, polycarbonate and the like.

The magnetic layer 2 includes, for example, a magnetic material, and oxygen (O) or the like may be added to the magnetic layer 2. As the material of the magnetic layer 2, for example, simple substances of ferromagnetic metals such as iron (Fe), cobalt (Co) and nickel (Ni), and ferromagnetic alloys such as an cobalt-nickel alloy, an iron-cobalt alloy, an iron-nickel alloy, a cobalt-platinum (Pt) alloy, a cobalt-nickel-platinum alloy, an iron-cobalt-nickel alloy, an iron-nickel-boron (B) alloy, an iron-cobalt-boron alloy, an iron-cobalt-nickel-boron alloy and a cobalt-chromium (Cr) alloy are cited.

The protective layer 3 is made of a carbon material including graphite, diamond-like carbon (DLC) or diamond, silicon dioxide ($SiO_2$) or the like, and in terms of film strength, the protective layer 3 is preferably made of a carbon material.

The topcoat layer 4 is made of, for example, a lubricant. As the lubricant, for example, an organic material such as a perfluorocarbon-based material, or a monoester-based material containing succinate as a main skeleton is cited. The topcoat layer 4 may include an additive except for the lubricant.

Figure 2:
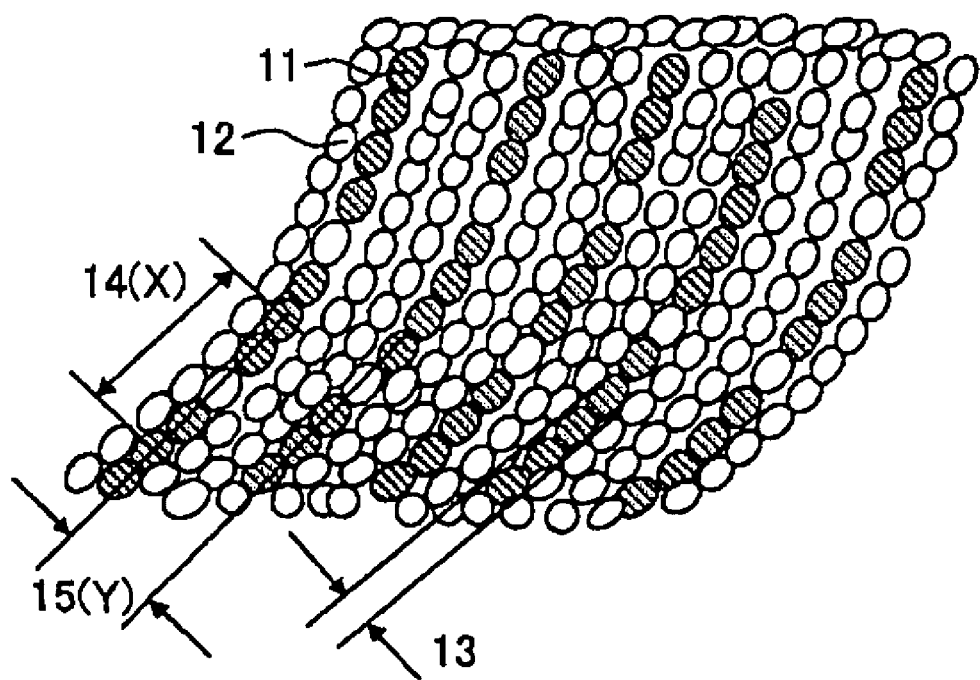
FIG. 2 is a sectional view of a magnetic layer shown in FIG. 1 (refer to Examples 1-1 and 1-3)

FIG. 2 shows a schematic sectional view of the magnetic layer 2 shown in FIG. 1. The magnetic layer 2 is formed through vacuum oblique evaporation. The magnetic layer 2 includes ferromagnetic particles 11 and non-magnetic particles 12, and has a structure (oblique columnar structure) including columns each of which includes a plurality of the ferromagnetic particles 11 arranged in a line. In a column, for example, three to seven of the ferromagnetic particles 11 are arranged in a line. In FIG. 2, three to five of the ferromagnetic particles 11 are arranged in a line. The non-magnetic particles 12 are filled between the columns. The ferromagnetic particles 11 and the non-magnetic particles 12 can be identified by high resolution observation using electron diffraction or a transmission electron microscope. Moreover, by a combination of these techniques and an element mapping technique, the microstructure of the magnetic layer 2 can be analyzed. As the element mapping technique, energy dispersive X-ray (EDX) spectroscopy or energy filtering is cited.

The magnetic layer 2 is preferably made of an oxygen-containing film into which oxygen is introduced during oblique evaporation, because the ferromagnetic particles 11 can be finer, and medium noise can be reduced. In this case, the ferromagnetic particles 11 are made of, for example, the above-described magnetic material, and the non-magnetic particles 12 are made of, for example, an oxide of the magnetic material. For example, in the case where the ferromagnetic particles 11 are made of cobalt particles, the non-magnetic particles 12 are made of cobalt oxide (CoO) particles with a high content of oxygen. CoO is known as an antiferromagnetic material having a Néel temperature of approximately 300 K. The Néel temperature is extremely close to room temperature, so the temperature does not has a large influence on the magnetic anisotropy of Co.

In order to have superior read/write characteristics, the diameter of a column (column diameter) 13 is preferably 15 nm or less. Moreover, the average diameter of the ferromagnetic particles 11 is preferably 10 nm or less, and more preferably within a range of 5 nm to 10 nm. When the ferromagnetic particles 11 are finer than the range, the ferromagnetic particles 11 exhibit superparamagnetism, and residual magnetization disappears. The diameter of the ferromagnetic particles 11 exhibiting superparamagnetism can be theoretically calculated using magnetic anisotropy. For example, cobalt particles with a diameter of approximately 2.6 nm or less exhibit superparamagnetism, so magnetic recording cannot be performed.

When the diameter of the ferromagnetic particles 11 is within the above-described range, the recording density of the magnetic recording medium can be increased, and the noise can be reduced. Moreover, the columns are not straight but slightly curved. The crystals of the ferromagnetic particles 11 are preferably oriented so that variation in the c-axis directions of the ferromagnetic particles 11 in the columns lies within a range of 20°.

As shown in FIG. 2, when an average value of a distance 14 between the centers of columns adjacent to each other in a film thickness direction is represented as a distance X between the centers of the columns in a film thickness direction, and an average value of a distance 15 between the centers of columns adjacent to in a film in-plane direction is represented as a distance Y between the centers of the columns in a film in-plane direction, a ratio Y/X of the distance Y between the centers of the columns in a film in-plane direction to the distance X between the centers of the columns in a film thickness direction is preferably 0.5 or more. When the ratio Y/X is less than 0.5, superior read/write characteristics cannot be obtained.

Moreover, in the magnetic layer 2, the product VacMst of a magnetization reversal volume Vac, saturation magnetization Ms and a thickness t is preferably $1.3 \times 10^{-23}$ Am$^3$ or less, and an anisotropic magnetic field Hk$^{grain}$ in a crystal grain in a plane including the longitudinal direction and the normal direction of the magnetic tape 10 is preferably 1100 kA/m or more. The magnetization reversal volume Vac and the anisotropic magnetic field Hk$^{grain}$ in a crystal grain are physical values relating to the size or the acicular ratio of the ferromagnetic particles 11 which have a large influence on noise characteristics, so when these values are within the above-described ranges, the size and the acicular ratio of magnetic particles can be controlled, thereby even if the thickness of the magnetic layer 2 is reduced, the noise can be reduced.

The magnetization reversal volume Vac is a minimum volume which causes magnetization reversal, and can be determined by Mathematical Formula 1. Moreover, the magnetization reversal volume Vac is not always agreed with the physical size of the magnetic particles.

$$Vac = (KT\chi_{irr})/(MsS) \quad \text{(Mathematical Formula 1)}$$

In Mathematical Formula 1, k indicates a Boltzmann constant, T indicates an absolute temperature, $\chi_{irr}$ indicates irreversible magnetic susceptibility determined by a residual magnetization curve, Ms indicates saturation magnetization, and S indicates magnetic viscosity determined by a rate of decrease in magnetization with respect to magnetic field application time in the case where a magnetic field is applied to a magnetic material.

The anisotropic magnetic field Hk$^{grain}$ in a crystal grain is an anisotropic magnetic field in an isolated crystal grain, and is a value which is not susceptible to a magnetization mode and crystalline orientation (refer to "Institute of Electrical and Electronics Engineers Transactions on Magnetics", 1992, 28, pp.3285-3287). For example, in the embodiment, the anisotropic magnetic field Hk$^{grain}$ in a crystal grain is represented by the sum of the crystal magnetic anisotropy of the magnetic material and the shape magnetic anisotropy by the shape of the magnetic particles. Therefore, it is considered that a change in the anisotropic magnetic field Hk$^{grain}$ in a crystal grain is mainly dependent upon a change in the acicular ratio of the magnetic particles.

The anisotropic magnetic field Hk$^{grain}$ in a crystal grain is determined as follows. Rotational hysteresis loss Wr is measured while a magnetic field H from a low magnetic field of 0 kA/m to 20 kA/m to a high magnetic field of 1200 kA/m is applied, and the rotational hysteresis loss Wr is plotted with respect to the inverse 1/H of the applied magnetic field, and data on the high magnetic field side is approximated by a quadric curve. In the quadric curve, the value of the magnetic field at the point where the rotational hysteresis loss Wr is zero is the anisotropic magnetic field Hk$^{grain}$. At this time, by using a method proposed by Noda (refer to "Institute o f Electrical a nd Electronics Engineers Transactions on Magnetics", 1991, 27, pp.4846-4848), an influence of shape anisotropy by the shape of a sample is preferably removed.

Moreover, in the magnetic layer 2, the product MsHc of the saturation magnetization Ms and the coercive force Hc is preferably 40000 MA$^2$/m$^2$ or more. When the product MsHc of the saturation magnetization Ms and the coercive force Hc is less than 40000 MA$^2$/m$^2$, a sufficient reproduction output cannot be secured, and when the product MsHc is 40000 MA$^2$/m$^2$ or more, even in a recording/reproduction system using an AMR head or a GMR head, a sufficient reproduction output can be secured. Further, the saturation magnetization Ms and the coercive force Hc are average values in the whole magnetic layer 2.

In addition, the product Mrt of the amount of residual magnetization Mr and the thickness t in the magnetic layer 2 is preferably within a range of 5 mA to 30 mA in the case where the magnetic tape is used for the AMR head, and within a range of 2 mA to 20 mA in the case where the magnetic tape is used for GMR head, because in each head, the symmetry properties of a reproduction waveform is the best within the above-described range of Mrt. In the case where the magnetic tape is used for the AMR head, the thickness t of the magnetic layer 2 is preferably 100 nm or less, and more preferably within a range of 30 nm to 80 nm, and in the case where the magnetic tape is used for the GMR head, the thickness t of the magnetic layer 2 is preferably 80 nm or less, and more preferably within a range of 20 nm to 40 nm. It is because a higher recording density can be achieved. Further, the magnetic layer 2 may have a single-layer structure or a laminate structure including two or more layers.

The magnetic tape can be manufactured through the following steps, for example.

Figure 3:
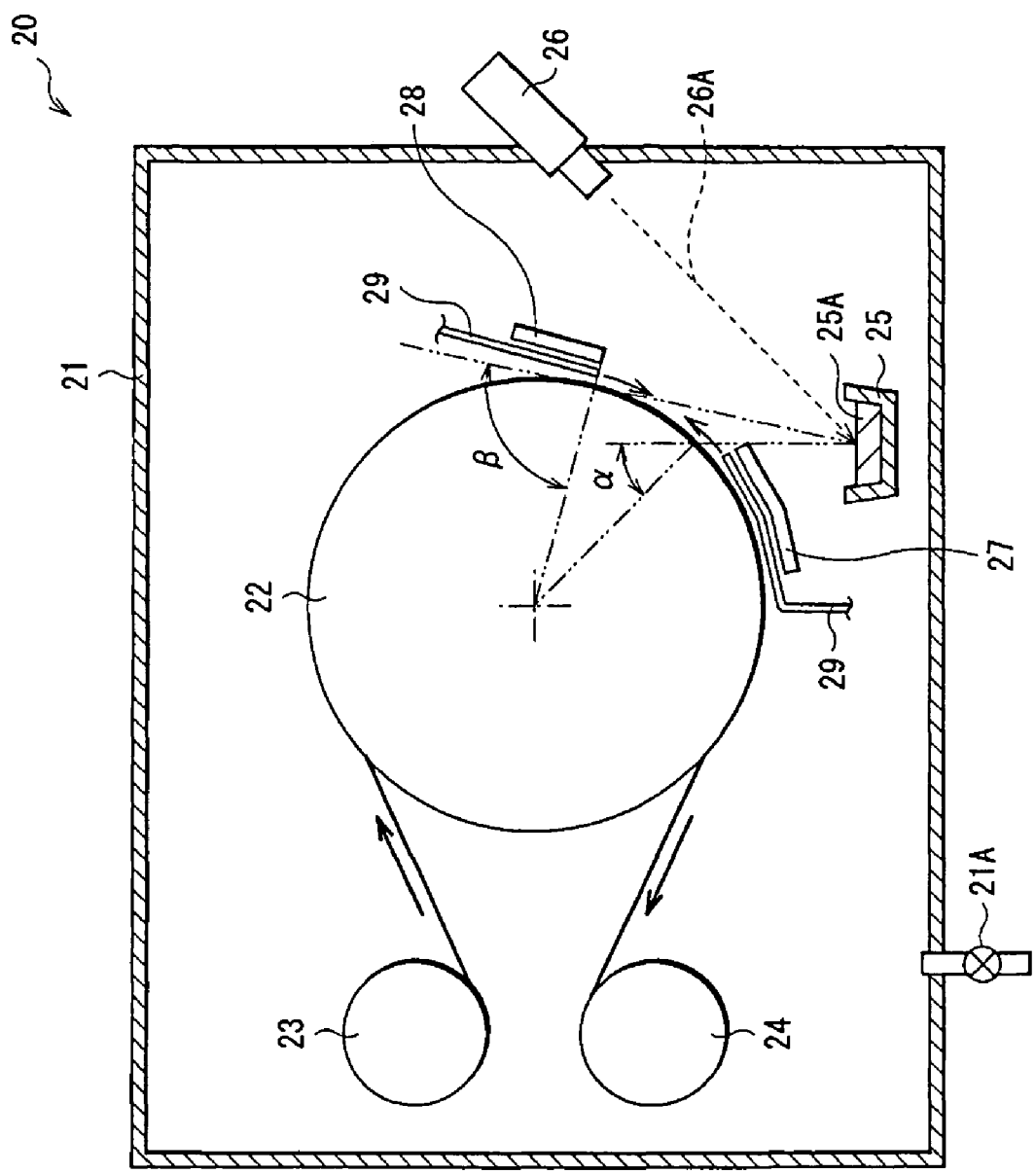
FIG. 3 is a sectional view of an evaporation apparatus used to manufacture the magnetic recording medium shown in FIG. 1.

At first, for example, the magnetic layer 2 is formed on the non-magnetic base 1 through oblique evaporation. FIG. 3 shows an example of a continuous winding system oblique evaporation apparatus used to form the magnetic layer 2. An evaporation apparatus 20 comprises a drum 22 which is rotatable in a direction of an arrow in a film forming chamber 21 where a vacuum pump 21A is disposed, and the non-magnetic base 1 wound around a supply reel 23 is taken up by a take-up reel 24 through the drum 22. The drum 22 has a cooling system (not shown), so the drum 22 is cooled to, for example, approximately −20° C. In the film forming chamber 21, a melting pot 25 containing an evaporation source 25A is disposed, and an electron beam 26A is irradiated from an electron gun 26 disposed in the film forming chamber 21 to form an evaporation film on the non-magnetic base 1 wound around the drum 22. As the evaporation source 25A, the above-described magnetic material of the magnetic layer 2 is used.

Moreover, a low incident angle side mask 27 and a high incident angle side mask 28 which control a component discharged from the melding pot 25 to the non-magnetic base 1 are disposed near the drum 22. The component discharged from the melting pot 25 to the non-magnetic base 1 is defined by an angle α between a straight line from the center of the melting pot 25 to an end of the low incident angle side mask 27 and a straight line from a position where the straight line from the center of the melting pot 25 to the end of the low incident angle side mask 27 intersects with the surface of the drum 22 to the center of the drum 22, and an angle β between a straight line from an end of the high incident angle side mask 28 to the center of the drum 22 and a straight line between a position where the straight line from the end of the high incident angle side mask 28 to the center of the drum 22 intersects with the surface of the drum 22 and the center of the melting pot 25, and an incident angle component is represented as α°-β°. At each of the ends of the low incident angle side mask 27 and the high incident angle side mask 28, an oxygen supply tube 29 is disposed.

The atmosphere of the film forming chamber 21 during evaporation is, for example, approximately $1 \times 10^{-1}$ Pa to $1 \times 10^{-3}$ Pa. Moreover, the tape line speed for taking up the non-magnetic base 1, the incident angle component α°-β°, the total amount of oxygen supply and the like are adjusted so as to control the structure of the magnetic layer 2, that is, the ratio Y/X of the distance Y between the centers of the columns in a film in-plane direction to the distance X between the centers of the columns in a film thickness direction, and physical properties of the magnetic layer 2, that is, the product VacMst of the magnetization reversal volume Vac, the saturation magnetization Ms and the thickness t, and the anisotropic magnetic field $Hk^{grain}$ in a crystal grain. For example, the tape line speed is preferably within a range of 50 m/min to 250 m/min. As the incident angle component, the angle α is preferably within a range of $30° \leq \alpha \leq 60°$, and the angle β is preferably within a range of $70° \leq \beta \leq 90°$. The total amount of oxygen supply is preferably within a range of 0.3 slm to 1.0 slm.

Next, on the magnetic layer 2, the protective layer 3 is formed through, for example, chemical vapor deposition (CVD) or physical vapor deposition (PVD), and then the topcoat layer 4 is formed on the protective layer 3. Thereby, the magnetic tape shown in FIGS. 1 and 2 is completed.

Thus, in the embodiment, the ratio Y/X of the distance Y between the centers of the columns in a film in-plane direction to the distance X between the centers of the columns in a film thickness direction in the magnetic layer 2 is 0.5 or more, so the read/write characteristics can be improved, and a higher recording density can be achieved. Moreover, when the thickness of the magnetic layer 2 is 100 nm or less, the magnetic tape meets the signal detection sensitivity of the AMR head or the GMR head, and these high-sensitive heads can be used for reproduction of recording signals. Thereby, the recording density can be improved.

Moreover, when the product VacMst of the magnetization reversal volume Vac, the saturation magnetization Ms and the thickness t in the magnetic layer 2 is $1.3 \times 10^{-23}$ Am$^3$ or less, and the anisotropic magnetic field $Hk^{grain}$ in a crystal grain is 1100 kA/m or more, the size and the acicular ratio of the ferromagnetic particles can be appropriately controlled, and even if the magnetic layer 2 has a thickness of, for example, 100 nm or less, the noise can be reduced, thereby superior magnetic conversion characteristics can be obtained. Therefore, even if the magnetic tape is used for the AMR head or the GMR head, superior output characteristics can be obtained.

Specifically, when the product MsHc of the saturation magnetization Ms and the coercive force Hc in the magnetic layer 2 is 40000 MA$^2$/m$^2$ or more, even if the magnetic tape is used for the AMR head or the GMR head, a superior reproduction output can be obtained.

Figure 4:
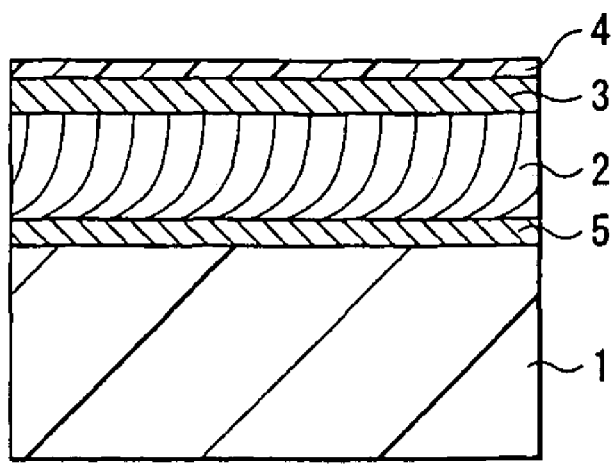
FIG. 4 is a sectional view of a modification of the magnetic recording medium shown in FIG. 1.

As shown in FIG. 4, a base layer 5 may be disposed between the non-magnetic base 1 and the magnetic layer 2. The base layer 5 includes, for example, a magnetic material, and oxygen may be added to the base layer 5. As the magnetic material of the base layer 5, for example, the same material as that of the magnetic layer 2 is cited, and bismuth (Bi), antimony (Sb), lead (Pb), tin (Sn), gallium (Ga), indium (In), cadmium (Cd), germanium (Ge), silicon (Si), titanium (Ti) and the like are cited. The base layer 5 is preferably formed through oblique evaporation as in the case of the magnetic layer 2, and the base layer 5 preferably has a columnar structure.

Further, a barrier layer (not shown) made of a non-magnetic material such as chromium or silicon dioxide may be disposed between the non-magnetic base 1 and the magnetic layer 2, and a back coat layer (not shown) including, for example, carbon black may be formed on a surface of the non-magnetic base 1 opposite to a surface where the magnetic layer 2 is disposed.

EXAMPLES

Next, specific examples of the invention will be described below.

Example 1-1

A magnetic tape shown in FIG. 1 was manufactured through the following steps. At first, a Co—O based magnetic layer 2 with a thickness of 50 nm was formed on a macromolecular film which is the non-magnetic base 1 through oblique evaporation. The oblique evaporation was performed at a tape line speed of 100 m/min through introducing an oxygen gas into an evaporation atmosphere from two separate spots. The total amount of oxygen supply was 0.65 slm. Moreover, the degree of vacuum during evaporation was $7 \times 10^{-2}$ Pa. The protective layer 3 was formed on the magnetic layer 2 through CVD, and the topcoat layer 4 was formed on the protective layer 3.

As the magnetic properties of the magnetic tape of the Example 1-1, the saturation magnetic flux density Bs was 450 mT, and the coercive force Hc was 130 kA/m. Moreover, when reproduction was performed by using the AMR head at a recording wavelength of 0.5 μm (a carrier frequency of 12 MHz), as the result of the read/write characteristics, a reproduction output of +2.2 dB and a CNR of +3.0 dB relative to Comparative Example 1-1 (which will be described later) were obtained. The noise level on the measurement of the CNR was an average value of a noise level at 10 MHz and a noise level at 14 MHz in a spectrum in the case where a recording wavelength of 0.5 μm (a carrier frequency of 12 MHz) was recorded.

A cross-sectional sample of the magnetic tape was formed by microtomy to observe by a transmission electron microscope. When the obtained high-resolution image was processed through Fourier transform to separate the magnetic particles (Co) and non-magnetic particles (CoO), a columnar structure shown in FIG. 2 was observed. As shown in FIG. 2, the ferromagnetic particles 11 were roughly arranged in lines, and the lines were separated by the non-magnetic particles 12.

The diameter of the ferromagnetic particles 11 was distributed over a range of 5 nm to 10 nm, and the average diameter was 7 nm. The column diameter 13 of the columns of the ferromagnetic particles 11 was 6 nm to 11 nm. The number of the ferromagnetic particles forming a line was 3 to 5 on average. Further, the ratio Y/X of the distance Y between the centers of the columns in a film in-plane direction to the distance X between the centers of the columns in a film thickness direction was 0.5.

Example 1-2

A magnetic tape was formed as in the case of Example 1-1, except that the total amount of oxygen supply was 0.7 slm, and the magnetic tape was evaluated. As the magnetic properties of the magnetic tape, the saturation magnetic flux density Bs was 450 mT, and the coercive force Hc was 150 kA/m. Moreover, when reproduction was performed by using an AMR head at a recording wavelength of 0.5 μm, as the result of the read/write characteristics, a reproduction output of +2.0 dB and a CNR of +2.5 dB relative to Comparative Example 1-1 were obtained.

Figure 5:
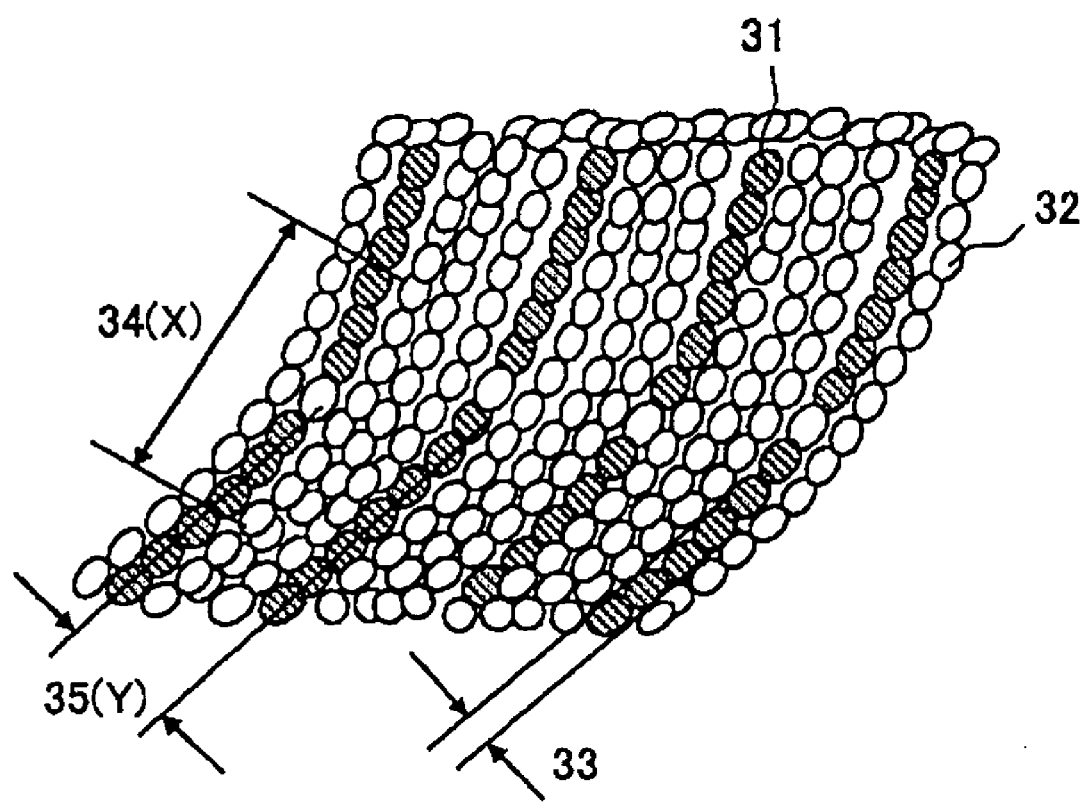
FIG. 5 is a sectional view of a magnetic layer of a magnetic recording medium according to the invention (refer to Examples 1-2 and 1-4)

As a result of observing a cross-sectional sample of the magnetic tape by a transmission electron microscope, a columnar structure shown in FIG. 5 was observed. As in the case of Example 1-1, ferromagnetic particles 31 were roughly arranged in lines, and the lines were separated by non-magnetic particles 32. The distribution and the average diameter of the ferromagnetic particles 31, and the column diameter 33 were the same as those in Example 1-1. Compared to Example 1-1, it was observed that slightly more ferromagnetic particles 31 formed a column, and the number of the ferromagnetic particles 31 in a line was 6 to 7. Moreover, the ratio Y/X of the distance Y between the centers of the columns in a film in-plane direction to the distance X between the centers of the columns in a film thickness direction was 0.6, which was slightly larger than that in Example 1-1.

Example 1-3

A magnetic tape was formed as in the case of Example 1-1, except that the tape line speed was 50 m/min, the thickness of the magnetic layer 2 was 100 nm, and the total amount of oxygen supply was 0.33 slm, and the magnetic tape was evaluated. As the magnetic properties of the magnetic tape, the saturation magnetic flux density Bs was 450 mT, and the coercive force Hc was 110 kA/m. Moreover, when reproduction was performed by using an AMR head at a recording wavelength of 0.5 μm, as the result of the read/write characteristics, a reproduction output of +3.0 dB and a CNR of +2.5 dB relative to Comparative Example 1-1 were obtained.

As a result of observing a cross-sectional sample of the magnetic tape by a transmission electron microscope, a columnar structure shown in FIG. 2 was observed. As in the case of Examples 1-1 and 1-2, the ferromagnetic particles 11 were roughly arranged in lines, and the lines were separated by the non-magnetic particles 12. The distribution and the average diameter of the ferromagnetic particles 11 were the same as those in Examples 1-1 and 1-2. Moreover, the column diameter 13 of the columns of the ferromagnetic particles 11 was 6 nm to 9 nm. The number of the ferromagnetic particles 11 in a line was equivalent to that in Example 1-1, that is, 3 to 5 on average. Moreover, the ratio Y/X of the distance Y between the centers of the columns in a film in-plane direction to the distance X between the centers of the columns in a film thickness direction was 0.5 which was the same as that in Example 1-1.

Example 1-4

A magnetic tape was formed as in the case of Example 1-3, except that the total amount of oxygen supply was 0.40 slm, and the magnetic tape was evaluated. As the magnetic properties of the magnetic tape, the saturation magnetic flux density Bs was 400 mT, and the coercive force Hc was 130 kA/m. Moreover, when reproduction was performed by using an AMR head at a recording wavelength of 0.5 μm, as the result of the read/write characteristics, a reproduction output of +3.2 dB and a CNR of +2.2 dB relative to Comparative Example 1-1 were obtained.

As a result of observing a cross-sectional sample of the magnetic tape by a transmission electron microscope, a columnar structure shown in FIG. 5 was observed. As in the case of Examples 1-1 through 1-3, the ferromagnetic particles 31 were roughly arranged in lines, and the lines were separated by the non-magnetic particles 32. The distribution and the average diameter of the ferromagnetic particles 31 was the same as those in Examples 1-1 through 1-3. Moreover, the column diameter 33 of the columns of the ferromagnetic particles 31 was 6 nm to 11 nm. It was observed that slightly more ferromagnetic particles 31 formed a column, and the number of the ferromagnetic particles 31 in a line was 6 to 7 on average. Moreover, the ratio Y/X of the distance Y between the centers of the columns in a film in-plane direction to the distance X between the centers of the columns in a film thickness direction was 0.6, which was the same as that in Example 1-2.

Comparative Example 1-1

A magnetic tape was formed as in the case of Example 1-1, except that an oxygen gas was introduced into an evaporation atmosphere from one spot, and the total amount of oxygen supply was 0.6 slm, and the magnetic tape was evaluated. As the magnetic properties of the magnetic tape, the saturation magnetic flux density Bs was 450 mT, and the coercive force Hc was 100 kA/m. Moreover, when reproduction was performed by using an AMR head at a recording wavelength of 0.5 µm, as the read/write characteristics, the reproduction output and the CNR were both 0 dB, because the reproduction output and the CNR of Comparative Example 1-1 were used as references to the read/write characteristics of other samples.

Figure 6:
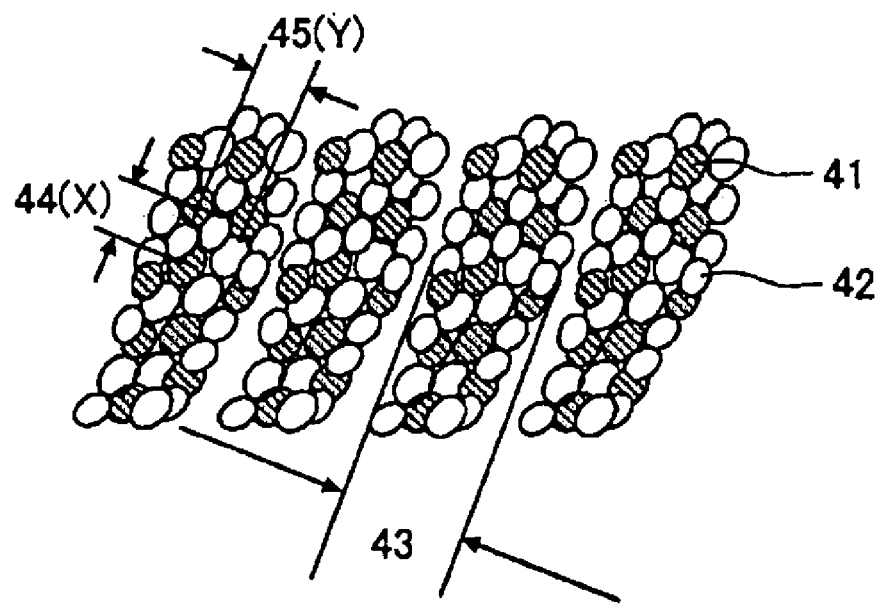
FIG. 6 is a sectional view of a magnetic layer of a magnetic recording medium of a comparative example (refer to Comparative Examples 1-1 and 1-2)

As a result of observing a cross-sectional sample of the magnetic tape by a transmission electron microscope, a columnar structure shown in FIG. 6 was observed. The columnar structure of Comparative Example 1-1 was different from the magnetic structures of Examples 1-1 through 1-4 in which the ferromagnetic particles were roughly arranged in lines.

In Comparative Example 1-1, as shown in FIG. 6, ferromagnetic particles 41 and non-magnetic particles 42 were randomly gathered to form a column. No line of the ferromagnetic particles 41 was observed. Although the diameter of the ferromagnetic particles 41 was distributed over a range of approximately 5 nm to 10 nm, the column diameter 43 was 15 nm to 25 nm, which was obviously larger than those of the samples in Examples 1-1 through 1-4. In Comparative Example 1-1, no line of the ferromagnetic particles 41 was observed, so a ratio Y/X of an average value Y of a distance 44 between the centers of adjacent ferromagnetic particles 41 in a film in-plane direction to an average value X of a distance 44 between the centers of adjacent ferromagnetic particles 41 in a film thickness direction was determined. The ratio Y/X in Comparative Example 1-1 was 0.5, which was the same as that in Example 1-1.

Comparative Example 1-2

A magnetic tape was formed as in the case of Example 1-3, except that an oxygen gas was introduced into an evaporation atmosphere from one spot, and the total amount of oxygen supply was 0.28 slm, and the magnetic tape was evaluated. As the magnetic properties of the magnetic tape, the saturation magnetic flux density Bs was 450 mT, and the coercive force Hc was 90 kA/m. Moreover, when reproduction was performed by using an AMR head at a recording wavelength of 0.5 µm, as the result of the read/write characteristics, a reproduction output of +1.5 dB and a CNR of −2.0 dB relative to Comparative Example 1-1 were obtained.

As a result of observing a cross-sectional sample of the magnetic tape by a transmission electron microscope, as in the case of Comparative Example 1-1, a columnar structure shown in FIG. 6 was observed. In other words, unlike a columnar structure in which ferromagnetic particles were roughly arranged in lines, a columnar structure in which the ferromagnetic particles 41 and the non-magnetic particles 42 were randomly gathered was formed. No line of the ferromagnetic particles 41 was observed. Although the diameter of the ferromagnetic particles 41 was distributed over a range of approximately 5 nm to 10 nm, the ferromagnetic particles 41 with a diameter of 12 nm or more were observed. As in the case of Comparative Example 1-1, the column diameter 43 was 15 nm to 25 nm, so the column diameter 43 was obviously larger than those of the samples in Examples 1-1 through 1-4. Moreover, the ratio Y/X of the average value Y of the distance 25 between the centers of the adjacent ferromagnetic particles 41 in a film in-plane direction to the average value X of the distance 44 between the centers of adjacent ferromagnetic particles 41 in a film thickness direction was 0.5, which was the same as that in Comparative Example 1-1.

Comparative Example 1-3

A magnetic tape was formed as in the case of Example 1-1, except that the tape line speed was 200 m/min, and the total amount of oxygen supply was 1.1 slm, and the magnetic tape was evaluated. As the magnetic properties of the magnetic tape, the saturation magnetic flux density Bs was 480 mT, and the coercive force Hc was 95 kA/m. Moreover, when reproduction was performed by using an AMR head at a recording wavelength of 0.5 µm, as the result of the read/write characteristics, a reproduction output of +1.0 dB and a CNR of −1.0 dB relative to Comparative Example 1-1 were obtained.

Figure 7:
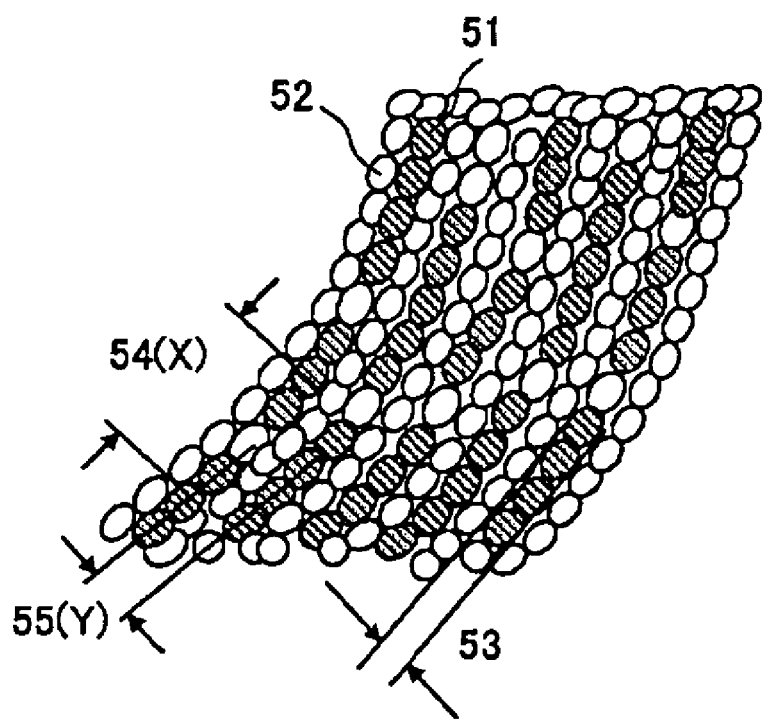
FIG. 7 is a sectional view of a magnetic layer of a magnetic recording medium of a comparative Example (refer to Comparative Example 1-3).

As a result of observing a cross-sectional sample of the magnetic tape by a transmission electron microscope, a columnar structure shown in FIG. 7 was observed. As in the case of Examples 1-1 through 1-4, ferromagnetic particles 51 were roughly arranged in lines, and the lines were separated by non-magnetic particles 52. The distribution and the average diameter of the ferromagnetic particles 51 were the same as those in Example 1-1 through 1-4. Moreover, the column diameter 53 of the columns of the ferromagnetic particles 51 was 5 nm to 10 nm. The number of the ferromagnetic particles 51 in a line was the same as that in Example 1-1, that is, 3 to 5 on average. The ratio Y/X of the distance Y between the centers of the columns in a film in-plane direction to the distance X between the centers of the columns in a film thickness direction was 0.2, which was smaller than those in Examples 1-1 through 1-4.

The magnetic properties and the read/write characteristics of the magnetic tapes of Examples 1-1 through 1-4 and Comparative Example 1-1 through 1-3 were summarized in Table 1.

TABLE 1

| | THICKNESS (nm) | SATURATION MAGNETIC FLUX DENSITY (mT) | Mrt (mA) | COERCIVE FORCE (kA/m) | PARTICLE DIAMETER | NUMBER OF PARTICLES IN A LINE | Y/X | COLUMN DIAMETER | REPRODUCTION OUTPUT (dB) | CNR (dB) |
|---|---|---|---|---|---|---|---|---|---|---|
| EXAMPLE 1-1 | 50 | 450 | 14 | 130 | 5–10 | 3–5 | 0.5 | 5–10 | +2.2 | +3.0 |
| EXAMPLE 1-2 | 50 | 400 | 14 | 150 | 5–10 | 6–7 | 0.6 | 5–10 | +2.0 | +2.5 |
| EXAMPLE 1-3 | 100 | 450 | 30 | 110 | 5–10 | 3–5 | 0.5 | 5–10 | +3.0 | +2.5 |
| EXAMPLE 1-4 | 100 | 400 | 32 | 130 | 5–10 | 6–7 | 0.6 | 5–10 | +3.2 | +2.2 |
| COMPARATIVE EXAMPLE 1-1 | 50 | 450 | 15 | 100 | 5–10 | NO LINE OBSERVED | 0.5 | 5–10 | 0 | 0 |
| COMPARATIVE EXAMPLE 1-2 | 100 | 450 | 29 | 90 | 5–10 | NO LINE OVSERVED | 0.5 | 5–10 | +1.5 | −2.0 |

TABLE 1-continued

|  | THICK-NESS (nm) | SATURATION MAGNETIC FLUX DENSITY (mT) | Mrt (mA) | COERCIVE FORCE (kA/m) | PARTICLE DIAMETER | NUMBER OF PARTICLES IN A LINE | Y/X | COLUMN DIAMETER | REPRODUCTION OUTPUT (dB) | CNR (dB) |
|---|---|---|---|---|---|---|---|---|---|---|
| COMPARATIVE EXAMPLE 1-3 | 50 | 480 | 13 | 95 | 5–10 | 3–5 | 0.2 | 5–10 | +1.0 | −1.0 |

As shown in Table 1, in Examples 1-1 through 1-4 in which the magnetic layer had a columnar structure including the ferromagnetic particles roughly arranged in lines, and the number of the ferromagnetic particles in a line was 3 to 7, and the ratio Y/X of the distance Y between the centers of the columns in a film in-plane direction to the distance X between the centers of the columns in a film thickness direction was 0.5 or more, the magnetic properties and the read/write characteristics were superior, compared to Comparative Examples 1-1 through 1-3. Therefore, the magnetic tapes with higher output and lower noise which were suitable for high density recording could be obtained.

Example 2-1

A magnetic tape shown in FIG. 1 was formed through the following steps. At first, the magnetic layer 2 of cobalt where oxygen was introduced was formed on the non-magnetic base 1 made of a macromolecular film through oblique evaporation using the evaporation apparatus 20 shown in FIG. 3. The atmosphere during evaporation was $7 \times 10^{-2}$ Pa, and the tape line speed was 55 m/min, and the incident angle component was 45°-90°. An oxygen gas was introduced into an evaporation atmosphere from two separate spots, and the total amount of oxygen supply was 0.60 slm. The thickness t of the magnetic layer 2 was 100 nm. Next, the protective layer 3 was formed on the magnetic layer 2 through CVD, and the topcoat layer 4 was formed on the protective layer 3. Thereby, the magnetic tape of Example 2-1 was obtained.

When the magnetic properties of the magnetic layer 2 in the obtained magnetic tape were examined, the product VacMst of the magnetization reversal volume Vac, the saturation magnetization Ms and the thickness t of the magnetic layer 2 was $1.30 \times 10^{-23}$ Am$^3$, and the anisotropic magnetic field Hk$^{grain}$ in a crystal grain in a plane including a longitudinal direction and a normal direction was 1199 kA/m. Moreover, the product MsHc of the saturation magnetization Ms and the coercive force Hc was 42120 MA$^2$/m$^2$, and the product Mrt of the residual magnetization Mr and the thickness t of the magnetic layer 2 was 28.5 mA.

Example 2-2

A magnetic tape was formed as in the case of Example 2-1, except that the total amount of oxygen supply was 0.75 slm. When the magnetic properties of the magnetic layer 2 in Example 2-2 were examined, the product VacMst of the magnetization reversal volume Vac, the saturation magnetization Ms and the thickness t was $0.736 \times 10^{-23}$ Am$^3$, and the anisotropic magnetic field Hk$^{grain}$ in a crystal grain in a plane including a longitudinal direction and a normal direction was 1193 kA/m. The product MsHc of the saturation magnetization Ms and the coercive force Hc was 51615 MA$^2$/m$^2$, and the product Mrt of the residual magnetization Mr and the thickness t was 26.2 mA.

Example 2-3

A magnetic tape was formed as in the case of Example 2-1, except that the tape line speed was 50 m/min, and the total amount of oxygen supply was 0.50 slm, and the incident angle component was 50°-80°. When the magnetic properties of the magnetic layer 2 in Example 2-3 were examined, the product VacMst of the magnetization reversal volume Vac, the saturation magnetization Ms and the thickness t was $0.673 \times 10^{-23}$ Am$^3$, and the anisotropic magnetic field Hk$^{grain}$ in a crystal grain in a plane including a longitudinal direction and a normal direction was 1114 kA/m. Moreover, the product MsHc of the saturation magnetization Ms and the coercive force Hc was 61835 MA$^2$/m$^2$, and the product Mrt of the residual magnetization Mr and the thickness t was 25.7 mA.

Example 2-4

A magnetic tape was formed as in the case of Example 2-1, except that the total amount of oxygen supply was 0.90 slm. When the magnetic properties of the magnetic layer 2 in Example 2-4 were examined, the product VacMst of the magnetization reversal volume Vac, the saturation magnetization Ms and the thickness t was $0.271 \times 10^{-23}$ Am$^3$, and the anisotropic magnetic field Hk$^{grain}$ in a crystal grain in a plane including a longitudinal direction and a normal direction was 1277 kA/m. Moreover, the product MsHc of the saturation magnetization Ms and the coercive force Hc was 29726 MA$^2$/m$^2$, and the product Mrt of the residual magnetization Mr and the thickness t was 14.0 mA.

Example 2-5

A magnetic tape was formed as in the case of Example 2-1, except that the tape line speed was 100 m/min, and the thickness t of the magnetic layer 2 was 50 nm. When the magnetic properties of the magnetic layer 2 in Example 2-5 were examined, the product VacMst of the magnetization reversal volume Vac, the saturation magnetization Ms and the thickness t was $0.523 \times 10^{-23}$ Am$^3$, and the anisotropic magnetic field Hk$^{grain}$ in a crystal grain in a plane including a longitudinal direction and a normal direction was 1208 kA/m. Moreover, the product MsHc of the saturation magnetization Ms and the coercive force Hc was 44080 MA$^2$/m$^2$, and the product Mrt of the residual magnetization Mr and the thickness t was 15.2 mA.

Example 2-6

A magnetic tape was formed as in the case of Example 2-1, except that the total amount of oxygen supply was 0.65 slm, and the thickness t of the magnetic layer 2 was 50 nm. When the magnetic properties of the magnetic layer 2 in Example 2-6 were examined, the product VacMst of the magnetization reversal volume Vac, the saturation magnetization Ms and the thickness t was $0.426 \times 10^{-23}$ Am$^3$, and the anisotropic magnetic field Hk$^{grain}$ in a crystal grain in a plane including a longitudinal direction and a normal direction was 1152 kA/m. Moreover, the product MsHc of the saturation magnetization Ms and the coercive force Hc was 49686 MA$^2$/m$^2$, and the product Mrt of the residual magnetization Mr and the thickness t was 13.9 mA.

Example 2-7

A magnetic tape was formed as in the case of Example 2-1, except that the tape line speed was 81 m/min, and the incident angle component was 45°-70°, and the thickness t of the magnetic layer 2 was 50 nm. When the magnetic properties of the magnetic layer 2 in Example 2-7 were examined, the product VacMst of the magnetization reversal volume Vac, the saturation magnetization Ms and the thickness t was $0.420 \times 10^{-23}$ Am$^3$, and the anisotropic magnetic field Hk$^{grain}$ in a crystal grain in a plane including a longitudinal direction and a normal direction was 1170 kA/m. Moreover, the product MsHc of the saturation magnetization Ms and the coercive force Hc was 53856 MA$^2$/m$^2$, and the product Mrt of the residual magnetization Mr and the thickness t was 16.1 mA.

Example 2-8

A magnetic tape was formed as in the case of Example 2-1, except that the total amount of oxygen supply was 0.90 slm, and the thickness t of the magnetic layer 2 was 50 nm. When the magnetic properties of the magnetic layer 2 in Example 2-8 were examined, the product VacMst of the magnetization reversal volume Vac, the saturation magnetization Ms and the thickness t was $0.149 \times 10^{-23}$ Am$^3$, and the anisotropic magnetic field Hk$^{grain}$ in a crystal grain in a plane including a longitudinal direction and a normal direction was 1257 kA/m. Moreover, the product MsHc of the saturation magnetization Ms and the coercive force Hc was 30316 MA$^2$/m$^2$, and the product Mrt of the residual magnetization Mr and the thickness t was 7.9 mA.

Example 2-9

A magnetic tape shown in FIG. 4 was formed through the following steps. At first, the base layer 5 made of cobalt where oxygen was introduced was formed on the non-magnetic base 1 made of the same macromolecular film as that in Example 2-1 through oblique evaporation using the evaporation apparatus 20 shown in FIG. 3. The atmosphere at that time was $7 \times 10^{-2}$ Pa, and the tape line speed was 100 m/min, and the incident angle component was 45°-90°. An oxygen gas was introduced into an evaporation atmosphere from two separate spots, and the total amount of oxygen supply was 1.60 slm. The thickness of the base layer 5 was 50 nm.

Next, on the base layer 5, the magnetic layer 2 made of cobalt where oxygen was introduced was formed through oblique evaporation using the evaporation apparatus 20 shown in FIG. 3. The atmosphere at that time was $7 \times 10^{-2}$ Pa, and the tape line speed was 250 m/min, and the incident angle component was 45°-90°. The oxygen gas was introduced into the evaporation atmosphere from two separate spots, and the total amount of oxygen supply was 0.60 slm. The thickness t of the magnetic layer 2 was 20 nm. Next, as in the case of Example 2-1, the protective layer 3 and the topcoat layer 4 were formed on the magnetic layer 2. Thereby, the magnetic tape of Example 2-9 was obtained.

When the magnetic properties of the magnetic layer 2 in Example 2-9 were examined, the product VacMst of the magnetization reversal volume Vac, the saturation magnetization Ms and the thickness t was $0.200 \times 10^{-23}$ Am$^3$, and the anisotropic magnetic field Hk$^{grain}$ in a crystal grain in a plane including a longitudinal direction and a normal direction was 1109 kA/m. Moreover, the product MsHc of the saturation magnetization Ms and the coercive force Hc was 58845 MA$^2$/m$^2$, and the product Mrt of the residual magnetization Mr and the thickness t was 6.1 mA.

Comparative Example 2-1

A magnetic tape was formed as in the case of Example 2-1, except that the total amount of oxygen supply was 0.40 slm, and the thickness t of the magnetic layer 2 was 50 nm. When the magnetic properties of the magnetic layer 2 in Comparative Example 2-1 were examined, the product VacMst of the magnetization reversal volume Vac, the saturation magnetization Ms and the thickness t was $1.31 \times 10^{-23}$ Am$^3$, and the anisotropic magnetic field Hk$^{grain}$ in a crystal grain in a plane including a longitudinal direction and a normal direction was 1099 kA/m. Moreover, the product MsHc of the saturation magnetization Ms and the coercive force Hc was 40000 MA$^2$/m$^2$, and the product Mrt of the residual magnetization Mr and the thickness t was 17.5 mA.

Comparative Example 2-2

A magnetic tape was formed as in the case of Example 2-1, except that the total amount of oxygen supply was 0.50 slm. When the magnetic properties of the magnetic layer 2 in Comparative Example 2-2 were examined, the product VacMst of the magnetization reversal volume Vac, the saturation magnetization Ms and the thickness t was $1.59 \times 10^{-23}$ Am$^3$, and the anisotropic magnetic field Hk$^{grain}$ in a crystal grain in a plane including a longitudinal direction and a normal direction was 1149 kA/m. Moreover, the product MsHc of the saturation magnetization Ms and the coercive force Hc was 53625 MA$^2$/m$^2$, and the product Mrt of the residual magnetization Mr and the thickness t was 34.4 mA.

Comparative Example 2-3

A magnetic tape was formed as in the case of Example 2-1, except that the tape line speed was 45 m/min, and the incident angle component was 60°-80°. When the magnetic properties of the magnetic layer 2 in Comparative Example 2-3 were examined, the product VacMst of the magnetization reversal volume Vac, the saturation magnetization Ms and the thickness t was $1.29 \times 10^{-23}$ Am$^3$, and the anisotropic magnetic field Hk$^{grain}$ in a crystal grain in a plane including a longitudinal direction and a normal direction was 1051 kA/m. Moreover, the product MsHc of the saturation magnetization Ms and the coercive force Hc was 53410 MA$^2$/m$^2$, and the product Mrt of the residual magnetization Mr and the thickness t was 25.6 mA.

Comparative Example 2-4

A magnetic tape was formed as in the case of Example 2-1, except that the total amount of oxygen supply was 0.90 slm, the tape line speed was 90 m/min, the incident angle component was 60°-90°, and the thickness t of the magnetic layer 2 was 50 nm. When the magnetic properties of the magnetic layer 2 in Comparative Example 2-4 were examined, the product VacMst of the magnetization reversal volume Vac, the saturation magnetization Ms and the thickness t was $0.477 \times 10^{-23}$ Am$^3$, and the anisotropic magnetic field Hk$^{grain}$ in a crystal grain in a plane including a longitudinal direction and a normal direction was 1045 kA/m. Moreover, the product MsHc of the saturation magnetization Ms and the coercive force Hc was 60372 MA$^2$/m$^2$, and the product Mrt of the residual magnetization Mr and the thickness t was 16.6 mA.

(Evaluation)

The read/write characteristics of the magnetic tapes of Examples 2-1 through 2-9 and Comparative Examples 2-1 through 2-4 were examined. As the read/write characteristics, the reproduction output and the CNR in the case where reproduction was performed by using an AMR head at the recording wavelength of 0.56 μm (a carrier frequency of 12 MHz) were determined. The noise level on the measurement of the CNR was an average value of a noise level at 10 MHz and a noise level at 14 MHz in a spectrum in the case where a recording wavelength of 0.56 μm (a carrier frequency of 12 MHz) was recorded. The obtained results are shown in Table 2. The values shown in Table 2 were relative values in the case where the values in Comparative Example 2-1 were zero as references.

reversal volume Vac, the saturation magnetization Ms and the thickness t and the anisotropic magnetic field Hk$^{grain}$ in a crystal grain were within the above ranges, the CNR could be improved.

Moreover, compared to Examples 2-1 through 2-3, 2-5 through 2-7 and 2-9 in which the product MsHc of the saturation magnetization Ms and the coercive force Hc was 40000 MA$^2$/m$^2$ or more, in Examples 2-4 and 2-8 in which the product MsHc was less than 40000 MA$^2$/m$^2$, the reproduction output was smaller. In other words, it was found out that the product MsHc of the saturation magnetization Ms and the coercive force Hc was preferably 40000 MA$^2$/m$^2$ or more, because the reproduction output could be improved.

Although the present invention is described referring to the embodiment and the examples, the invention is not limited to the embodiment and the examples, and can be variously modified. For example, in the above embodiment and the above examples, the laminate structure of the magnetic tape is described referring to an example; however, all layers may not be included, or any other layer may be further included.

Moreover, in the above embodiment and the above examples, the material and a film forming method of each layer of the magnetic tape are described referring to specific examples; however, each layer may be made of any other material, and any other film forming method may be used.

TABLE 2

|  | THICKNESS (nm) | VacMst × 10$^{-23}$ (A·m$^3$) | Hk$^{grain}$ (kA/m) | MsHc (MA$^2$/m$^2$) | Mrt (mA) | REPRODUCTION OUTPUT (dB) | CNR (dB) |
|---|---|---|---|---|---|---|---|
| EXAMPLE 2-1 | 100 | 1.30 | 1199 | 42120 | 28.5 | +2.7 | +0.4 |
| EXAMPLE 2-2 | 100 | 0.736 | 1193 | 51615 | 26.2 | +3.3 | +1.9 |
| EXAMPLE 2-3 | 100 | 0.673 | 1114 | 61835 | 25.7 | +1.2 | +0.5 |
| EXAMPLE 2-4 | 100 | 0.271 | 1277 | 29726 | 14.0 | −1.1 | +2.1 |
| EXAMPLE 2-5 | 50 | 0.523 | 1208 | 44080 | 15.2 | +0.4 | +1.8 |
| EXAMPLE 2-6 | 50 | 0.426 | 1152 | 49686 | 13.9 | +0.6 | +1.5 |
| EXAMPLE 2-7 | 50 | 0.420 | 1170 | 53856 | 16.1 | +0.3 | +1.6 |
| EXAMPLE 2-8 | 50 | 0.149 | 1257 | 30316 | 7.9 | −3.1 | +3.3 |
| EXAMPLE 2-9 | 20 | 0.200 | 1109 | 58845 | 6.1 | +0.2 | +0.3 |
| COMPARATIVE EXAMPLE 2-1 | 50 | 1.31 | 1099 | 40000 | 17.5 | 0 | 0 |
| COMPARATIVE EXAMPLE 2-2 | 100 | 1.59 | 1149 | 53625 | 34.4 | +3.9 | −0.5 |
| COMPARATIVE EXAMPLE 2-3 | 100 | 1.29 | 1051 | 53410 | 25.6 | +1.6 | −1.7 |
| COMPARATIVE EXAMPLE 2-4 | 50 | 0.477 | 1045 | 60372 | 16.6 | +0.4 | −0.3 |

As shown in Table 2, in Examples 2-1 through 2-9 in which the product VacMst of the magnetization reversal volume Vac, the saturation magnetization Ms and the thickness t was $1.3 \times 10^{-23}$ Am$^3$ or less, and the anisotropic magnetic field Hk$^{grain}$ in a crystal grain was 1100 kA/m or more, the CNR could be larger than that in Comparative Example 2-1 in which the product VacMst of the magnetization reversal volume Vac, the saturation magnetization Ms and the thickness t and the anisotropic magnetic field Hk$^{grain}$ in a crystal grain were both out of the ranges. On the other hand, in Comparative Examples 2-2 through 2-4 in which either the product VacMst of the magnetization reversal volume Vac, the saturation magnetization Ms and the thickness t or the anisotropic magnetic field Hk$^{grain}$ in a crystal grain was out of the range, the CNR was smaller than that in Comparative Example 2-1. In other words, it was found out that when the product VacMst of the magnetization Further, in the above embodiment and the above examples, the case where the magnetic tape is used for the AMR head or the GMR head is described; however, the magnetic tape may be used for any other head. In addition, the invention can be applied to not only the magnetic tape but also any other magnetic recording medium such as a disk.

According to the invention, the read/write characteristics of the magnetic recording medium can be improved, and a higher recording density of the magnetic recording medium can be achieved.

Obviously many modifications and variations of the present invention are possible in the light of the above teachings. It is therefore to be understood that within the scope of the appended claims the invention may be practiced otherwise than as specifically described.

What is claimed is:

1. A magnetic recording medium comprising:
a magnetic layer with an oblique columnar structure on a non-magnetic base, wherein the columnar structure includes:
 a plurality of curved columnar sub-structures extending from a lower surface of said magnetic layer to an upper surface of said magnetic layer, wherein each of said curved columnar sub-structures comprises;
 a plurality of columns which are clusters of ferromagnetic particles; and
 non-magnetic particles disposed around the columns and between said curved columnar sub-structures so as to separate the columns from one another,
wherein,
 a value Y/X is 0.5 or more, where Y/X is defined as a ratio of an average value Y of a distance between the centers of the columns adjacent to each other in a film in-plane direction in adjacent curved columnar sub-structures to an average value X of a distance between the centers of the columns adjacent to each other in a film thickness direction within the same curved columnar sub-structure,
 the columns each have a structure in which three to seven of the ferromagnetic particles are arranged in a line,
 the average diameter of the ferromagnetic particles is within a range of 5 nm to 10 nm inclusive, and
 the thickness of the magnetic layer is 100 nm or less.

2. A magnetic recording medium according to claim 1, wherein in the magnetic layer, the product VacMst of a magnetization reversal volume Vac, saturation magnetization Ms and a thickness t is $1.3 \times 10^{-23}$ Am$^3$ or less, and an anisotropic magnetic field Hk$^{grain}$ in a crystal grain is 1100 kA/m or more.

3. A magnetic recording medium according to claim 1, wherein in the magnetic layer, the product MsHc of saturation magnetization Ms and coercive force Hc is 40000 MA$^2$/m2 or more.

4. A magnetic recording medium according to claim 1, wherein the magnetic recording medium is used for a head using an anisotropic magnetoresistive effect or a giant magnetoresistive effect.

* * * * *